Aug. 22, 1967 J. BAUDE 3,337,785
SYNCHRONOUS MOTOR STARTING SYSTEM
Filed March 23, 1964
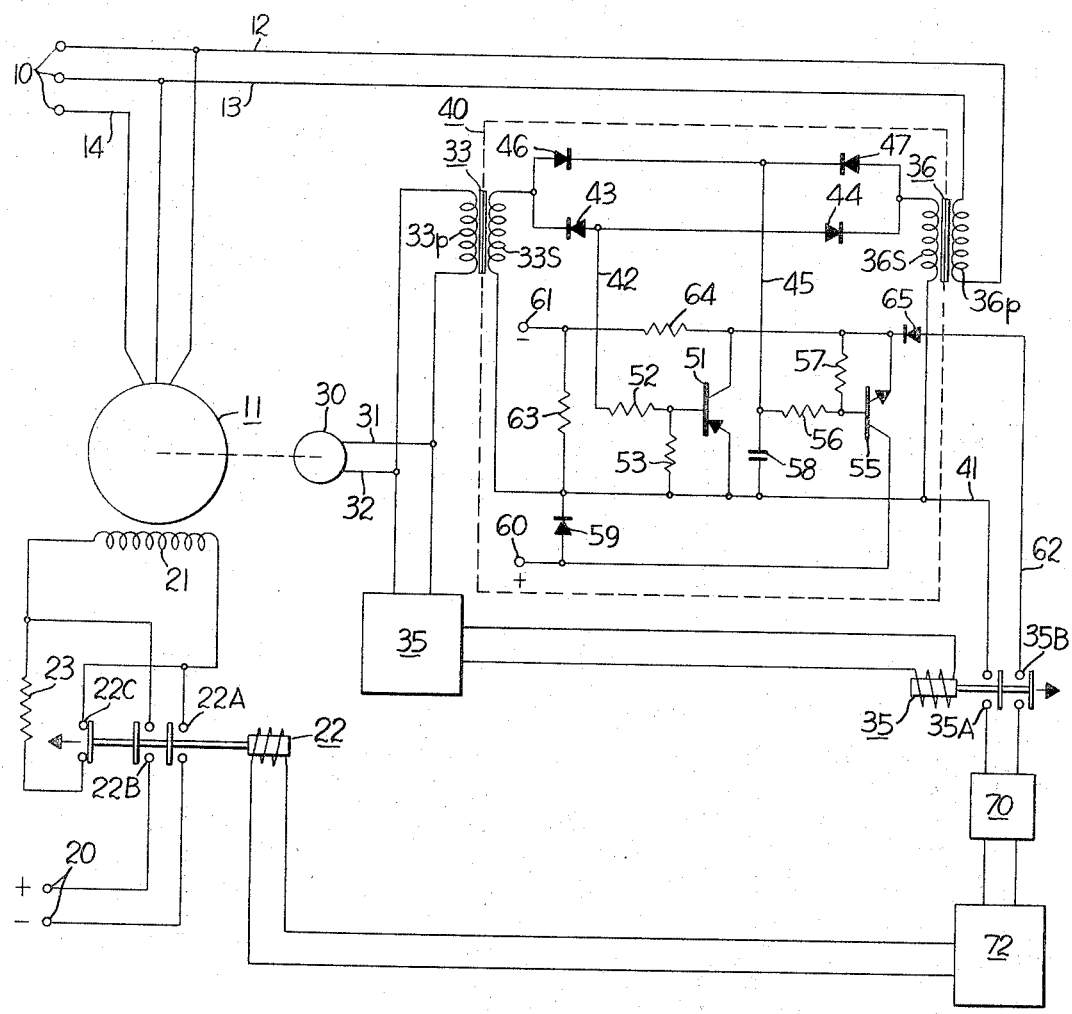
Inventor
John Baude
By R J Falkowski
Attorney ized Aug. 22, 1967

3,337,785
SYNCHRONOUS MOTOR STARTING SYSTEM
John Baude, Milwaukee, Wis., assignor to Allis-Chalmers Manufacturing Company, Milwaukee, Wis.
Filed Mar. 23, 1964, Ser. No. 353,816
16 Claims. (Cl. 318—175)

This invention relates to synchronous motor control systems, particularly to angle switching synchronous motor starting systems.

Synchronous motors are started as induction motors. When the motor has reached a preselected percentage of synchronous speed, the field winding is energized from a direct current source and the motor then operates in synchronism with the alternating current power supply. The field energization is preferably accomplished at a particular phase angle between the field pole and the stator magnetic flux wave. Accurate angle switching is desirable and is usually necessary with relatively large motors.

With this invention it is possible to accurately determine the phase angle between the rotor pole and the magnetic flux wave thereby enabling accurate selection of the time of field energization.

A system according to this invention utilizes means responsive to the speed of rotation of the rotor of a synchronous motor for producing an output having a wave form indicating the field pole position and a frequency varying as a function of the rotor speed. When the rotor attains a predetermined speed of rotation, the varying frequency is compared to the phase angle of the electrical power supply and a signal pulse is produced when the power source and the varying frequency are simultaneously in phase at a zero point in their cycles. The use of zero points enables an accurate comparison not obtainable when other points in a wave form are used. This signal pulse accurately indicates a particular phase relationship between the rotating stator flux field and the field poles. By adjusting the means for producing the varying frequency a preselected phase angle between the field pole and the varying frequency may be sensed. If necessary, an appropriate time delay after the signal pulse can be introduced to allow for the time required to close contacts and energize the field winding.

The objects of this invention are to provide a new and improved synchronous motor starting system; to provide a synchronous motor starting system that does not utilize the current induced in the field winding of the synchronous motor in determining the time of field energization; to provide a synchronous motor starting system that accurately determines the phase relationship between the synchronous motor stator magnetic flux and the field poles; and to provide a synchronous motor starting system capable of accurate timing of field excitation application.

The figure is a drawing of an embodiment of this invention.

Referring to the figure, an alternating current power source such as a three phase alternating current power source 10 supplies power to a synchronous motor 11 along conductors 12, 13 and 14.

A DC source 20 is connected to a field winding 21 of synchronous motor 11 through contacts 22A and 22B of a contactor 22. A field resistor 23 and a contact 22C are connected in series with field winding 21. Upon energization of contactor 22, contacts 22A and 22B are closed and contact 22C is opened. A transducer 30, shown connected to rotate with the rotor of synchronous motor 11, produces an output along conductors 31 and 32 that is delivered to a primary winding 33p of a transformer 33 and to a speed sensing circuit 35.

One phase of source 10 is delivered along conductors 12 and 13 to a primary winding 36p of a transformer 36. A phase comparison means 40 is connected to receive a measure of the power source and the transducer output through transformers 36 and 33 at secondary windings 36s and 33s, respectively.

In phase comparison means 40 one terminal of secondary windings 33s and one terminal of secondary winding 36s are connected to a conductor 41. The other terminal of secondary winding 33s and the other terminal of secondary winding 36s are connected to a conductor 42 through diodes 43 and 44 and are connected to a conductor 45 through diodes 46 and 47.

Conductor 42 is connected to a base of a pnp resistor 51 through a base current limiting resistor 52. A biasing resistor 53 is connected between the base and emitter of transistor 51.

Conductor 45 is similarly connected to a base of an npn transistor 55 through a base limiting resistor 56. A biasing resistor 57 is connected between the base and emitter of transistor 55. A capacitor 58 is connected between conductor 45 and the collector of transistor 55 through a diode 59.

A source of electrical energy, such as a direct current source, is applied at terminals 60 and 61 which are connected through the phase comparison means to conductors 41 and 62. The emitter-collector circuits, which function as output circuits, of transistors 51 and 55 and a loading resistor 63 are connected in parallel across conductors 41 and 62.

A limiting resistor 64 is connected between the direct current source and the parallelly connected output circuits of transistors 51 and 55. Diode 65 is connected to prevent reverse current flow to the subsequent circuitry along conductors 41 and 62. Diode 59 makes the collector of transistor 55 slightly more positive than the emitter of transistor 51 to assure more stable operation of the circuitry.

Conductors 41 and 62 deliver the output of phase comparison means 40 to a time delay means 70 through contacts 35A and 35B of a relay 35. Contacts 35A and 35B are closed by the operation of speed sensing means 35 when a predetermined frequency has been attained by transducer 30. This predetermined frequency indicates that the motor has achieved a selected speed relative to the synchronous speed that is sufficiently high to permit successful synchronization.

Time delay means 70 is connected to a control means 72 that energizes relay 22 when an appropriate signal is received from the phase comparison means.

In the operation of the system shown in the figure, electrical power is supplied from source 10 to synchronous motor 11. As motor 11 begins rotating, transducer 30 begins producing an output having a frequency proportional to the speed of rotation. The phase angle of this frequency has a predetermined relationship to the rotor pole position. This relationship is selectable and therefore enables a time delay to be introduced at this point in the system if necessary. As the speed of the synchronous motor approaches synchronism, the frequency of the output of transducer 30 increases toward a maximum frequency. This maximum frequency would usually be selected to be the same as the frequency of the alternating current source.

When the frequency of transducer 30 reaches a predetermined frequency, speed sensing circuit 35 closes contacts 35A and 35B to connect phase comparison circuit 40 to control means 72 through time delay means 70.

A measure of the output of transducer 30 and of a phase of alternating current power source 10 appears at secondary windings 33s and 36s, respectively. Gating means, comprising diodes 43, 44, 46 and 47 connected to receive the signals appearing at the secondary windings, produces a first output along conductor 45 varying as an instantaneous function of the positive portions of the signals appearing at the secondary windings and produces a second output along conductor 42 varying as an instantaneous function of the negative portions of the signals appearing at the secondary windings.

Electronic switching means or circuits are provided by transistors 51 and 55 with their emitter-collector circuits operating as output circuits. The transistors are connected to receive the positive and negative outputs from the gating means as inputs to control flow of electrical energy from the direct current source at terminals 60 and 61 to timing means 70 and control means 72 when contacts 35A and 35B are closed.

The polarity of the signals applied to the bases of the transistors determine the conditions of their output circuits to provide an on, or conducting, condition, and an off, or nonconducting, condition. When the output along conductor 45 is positive (when the polarity of either one of the inputs appearing at the secondary windings is positive), transistor 55 is turned on to effectively maintain the voltage appearing across conductors 41 and 62 at zero. Similarly, when the output along conductor 42 is negative (when the polarity of either one of the inputs is negative), transistor 51 is turned on to effectively maintain the voltage appearing across conductors 41 and 62 at zero. When either one of the inputs is not at zero, at least one of the transistors is turned on. When either one or both of the transistors is on, a short circuit is maintained across the emitter-collector circuits of the turned on transistor and the voltage of the direct current source appears across resistors 63 and 64 while the voltage appearing across conductors 41 and 62 is substantially zero. The low resistance of the turned on emitter-collector circuit of the conducting transistor or transistors prevents any significant voltage from appearing across conductors 41 and 62.

When both inputs appearing at the secondary windings 33s and 36s are at zero points in their cycles, both transistors are turned off and the potential of direct current source 60 appears across resistor 64, diode 65, diode 59, and between conductors 41 and 62. This potential between conductors 41 and 62 is the output signal or pulse of the phase comparison means that indicates that both inputs from secondary windings 33s and 36s are simultaneously at zero points in their wave forms.

Means are provided for controlling the output condition of one of the transistors to produce the output signal or pulse only when the inputs are in phase at zero point in their wave forms. In this embodiment this means is an electrical energy storage means such as capacitor 58 that functions to maintain transistor 55 conductive for a time, a fraction of a cycle, after the input applied to its base is no longer positive. Capacitor 58 charges as the positive signal is applied to the base of transistor 55 along conductor 45 and discharges when the potential of the inputs along conductor 45 is zero. Discharging of capacitor 58 keeps transistor 55 temporarily conductive by keeping its base positive until the capacitor is discharged. Capacitor 58 is selected to assure that the discharge lasts sufficiently long to prevent the turning on of transistor 55 at the zero point in the cycle occurring after each positive half cycle.

Therefore, the output pulse occurs when both inputs are zero after their respective negative half cycles. The relationship of negative to positive half cycles can be determined and selected in the output of the frequency generator means or by the relative direction of the primary and secondary windings of transformers 33 and 36. This selection is determined to produce the control output when the field poles and the rotating stator flux are at the desired angle. Also, capacitor 58 can be connected to either transistor 51 or 55 to select the zero occurring after either the positive or the negative half cycles.

After the rotor has obtained a predetermined speed, speed sensing means 35 closes contacts 35A and 35B. The pulse appearing across conductors 41 and 62 can be delayed by time delay circuit 70 for a predetermined length of time, if necessary.

This length of time delay would be determined primarily by the time required to energize the field winding because this time can exceed the time of a cycle. Time delays of less than a cycle can be easily accomplished by adjustment of the relationship between the transducer output wave form and the field poles position. These delays are constant and predictable and as a result the time excitation of the field winding can be accurately selected because the phase angle of stator flux and field pole is accurately sensed.

The signal pulse received by control means 72 activates the control means to energize the coil of contactor 22 to operate its contact to apply excitation to the synchronous motor. In the system shown, the control means functions to maintain the contactor coil energized. Other circuits can be used to provide other types of protection for the motor and these could be applied to the control means or could operate in any of the many ways known in the art.

In describing the invention, the preferred embodiment has been shown and described but it is obvious to one skilled in the art that there are many variations, combinations, alterations, and modifications that may be made without departing from the spirit of the invention or from the scope of the appnded claims.

The embodiments of the invention in which an exclusive property or privilege is claimed are defined as follows:

1. A synchronous motor starting system wherein the synchronous motor is energized by an alternating current power source, said system having means for connecting the field winding of the synchronous motor to a direct current source at a predetermined phase angle between the rotating magnetic flux wave and the field pole position, said means comprising:
  means responsive to the speed of the motor for producing an output having a frequency varying as a direct function of the motor speed and having a predetermined phase relationship to the field pole position of the motor;
  means responsive to the alternating current source and responsive to the output for producing a signal pulse when the wave form of the alternating current source and the wave form of the first means output are in phase at a zero point; and
  means connected to receive the signal pulse for substantially instantaneously connecting the field winding to the direct current source.

2. A synchronous motor starting system wherein the synchronous motor is energized by an alternating current power source, said system having means for connecting the field winding of the synchronous motor to a direct current source at a predetermined phase angle between the rotating magnetic flux wave and the field pole position, said means comprising:
  first means responsive to the speed of the motor for producing an output having a frequency varying as a direct function of the motor speed and having a predetermined phase relationship to the field pole position of the motor;
  second means connected to receive electrical energy from the direct current source for substantially instantaneously connecting the field winding to the direct current source; and
  third means responsive to the alternating current source and responsive to the first means output for controlling the flow of electrical energy from the direct current source to the second means in response to a predetermined polarity change of the alternating current source and of the first means output.

3. A system according to claim 2 wherein said third means comprises:
  one transistor responsive to a negative input;
  another transistor responsive to a positive input;
  said transistors connected to control the flow of electrical energy from the direct current source to the second means; and
  means connected to the alternating current source and the first means for separating the electrical energy from the alternating current source and the first means into positive polarity portions and negative polarity portions and for connecting said one transistor to receive the negative portions and for connecting said other transistor to receive the positive portions.

4. A circuit according to claim 3 wherein means are connected to said one transistor for maintaining said one transistor conductive for a predetermined time after removal of a positive input.

5. A synchronous motor starting system wherein the synchronous motor is energized by an alternating current power source, means for energizing the field winding of said synchronous motor from a direct current source comprising:
  means connected to rotate with the rotor of the synchronous motor for producing an output having a frequency varying as a function of the rotor speed and having a preselected phase relationship to the field pole position of the motor;
  means connected to receive a measure of the alternating current power source and connected to receive the output for producing a control signal when the output and the measure of the alternating current source are simultaneously in phase at a zero point in their wave forms; and
  control means responsive to the control signal for connecting the field winding to the direct current source.

6. A system according to claim 5 wherein the means for producing a control signal comprises:
  means connected to receive a measure of the alternating current source and a measure of the output as input signals for producing a first output varying as an instantaneous function of the sum of the negative portions of the input signals and for producing a second output varying as an instantaneous function of the sum of the positive portions of the input signals;
  first semiconductor switching means, having an output circuit, connected and responsive to the first output to open its output circuit when said first output is substantially zero;
  second semiconductor switching means, having an output circuit, connected and responsive to the second output to open its output circuit when said second output is substantially zero; and
  said two switching means output circuits connected in parallel across said source of electrical energy to produce the control signal upon simultaneous opening of the output circuits of the first and second switching means.

7. A circuit according to claim 6 wherein the circuit also comprises means connected to one of the switching means for delaying the opening of the output circuit of said one of the switching means.

8. A synchronous motor starting system wherein the synchronous motor is energized by an alternating current power source, means for energizing the field winding of said synchronous motor from a direct current source comprising:
  means connected to rotate with the rotor of the synchronous motor for producing an output having a frequency proportional to the motor speed with said output having a predetermined phase angle relative to the position of the field poles of the motor;
  means connected to receive a measure of the alternating current power source and connected to receive the output for producing a control signal when the output and the measure of the alternating current source are simultaneously in phase at a zero point in their wave forms; and
  control means responsive to the control signal for connecting the field winding to the direct current source.

9. A synchronous motor starting system wherein the synchronous motor is energized by an alternating current power source, said system having means for connecting the field winding of the synchronous motor to a direct current source at a predetermined phase angle between the rotating magnetic flux wave and the field pole position, said means comprising:
  first means responsive to the speed of the motor for producing an output having a frequency varying as a direct function of the motor speed and having a predetermined phase angle relative to the position of the field pole of the motor;
  second means responsive to the alternating current source and responsive to the first means output for producing a signal pulse when the wave form of the alternating current source and the wave form of the first means output are in phase at a zero point in their wave forms;
  third means connected to the second means to receive the signal pulse for substantially instantaneously connecting the field winding to the direct current source; and
  means interposed between the second means and the third means for delaying the signal pulse for a predetermined time.

10. A synchronous motor starting system wherein the synchronous motor is energized by an alteranting current power source, means for energizing the field winding of said synchronous motor from a direct current source comprising:
  frequency generating means connected to rotate with the rotor of the synchronous motor for producing an output having a frequency varying as a function of the speed of the rotor and having a predetermined phase relationship to the field poles of the motor;
  phase comparison means connected to receive a measure of the alternating current power source and connected to received the output of the frequency generating means for producing a control signal when the output of the frequency generating means and the measure of the alternating current source are simultaneously in phase at a zero point in their wave forms;
  control means responsive to the control signal for connecting the field winding to the direct current source; and
  means interposed between the phase comparison means and the control means for delaying the control signal for a predetermined time.

11. A synchronous motor starting system wherein the synchronous motor is energized by an alternating current power source, said system having means for connecting the field winding of the synchronous motor to a direct current source at a predetermined phase angle between the rotating magnetic flux wave and the field pole position, said means comprising:
  first means responsive to the speed of the motor for producing an output having a frequency varying as a direct function of the motor speed and having a predetermined phase relationship to the field poles of the motor;
  second means responsive to the alternating current source and responsive to the first means output for producing a signal pulse when the wave form of the alternating current source and the first means output are in phase at a zero point;
  third means connected to the second means to receive the signal pulse for substantially instantaneously connecting the field winding to the direct current source; and fourth means responsive to the speed of the motor for making the third means inoperative when the motor speed is less than a predetermined speed.

12. A synchronous motor starting system wherein the synchronous motor is energized by an alternating current power source, said system having means for connecting the field winding of the synchronous motor to a direct current source at a predetermined phase angle between the rotating magnetic flux wave and the field pole position, said means comprising:

first means responsive to the speed of the motor for producing an output having a frequency proportional to the motor speed with said frequency having a predetermined phase relationship to the field pole position;

second means responsive to the alternating current source and responsive to the first means output for producing a signal pulse when the wave form of the alternating current source and the wave form of the first means output are in phase at a zero point;

third means connected to the second means to receive the signal pulse for substantially instantaneously connecting the field winding to the direct current source;

fourth means responsive to the speed of the motor for disconnecting the second means from the third means when the motor is at less than a predetermined speed; and fifth means interposed between the second means and the third means for delaying the signal pulse a predetermined time.

13. A synchronous motor starting system wherein a synchronous motor is energized by a polyphase power source, said system having means for connecting the field winding of the motor to a direct current source at a predetermined phase angle between the rotating magnetic flux wave and the field poles position, said means comprising:

a transducer connected to rotate with the motor to produce an output having a frequency varying as a function of the speed of the motor and having a predetermined phase angle relationship to the position of the field poles;

a phase comparison circuit connected to receive a measure of a phase of the polyphase power source and a measure of the transducer output for producing a signal pulse when the measure of the phase and the measure of the transducer output are simultaneously in phase at a zero point in their wave forms; and a control circuit connected to the phase comparison circuit for connecting the field winding to the direct current source in response to the signal pulse to effect excitation of the field winding at a predetermined phase angle between the rotating magnetic flux wave and the position of the field poles.

14. A synchronous motor starting system wherein a synchronous motor is energized by a polyphase power source, said system having means for connecting the field winding of the motor to a direct current source at a predetermined phase angle between the rotating magnetic flux wave and the field poles position, said means comprising:

a transducer connected to rotate with the motor to produce an output having a frequency varying as a function of the speed of the motor and having a predetermined adjustable phase angle relationship to the position of the field poles;

a phase comparison circuit connected to receive a measure of a phase of the polyphase power source and a measure of the transducer output for producing a signal pulse when the measure of the phase and the measure of the transducer output are simultaneously in phase at a zero point in their wave forms;

a control circuit for connecting the field winding to the direct current source in response to the signal pulse to effect excitation of the field winding at a predetermined phase angle between the rotating magnetic flux wave and the position of the field poles; and a speed sensing circuit connected to receive the transducer output and responsive to the frequency of the transducer output for connecting the phase comparison circuit to the control circuit only when the motor speed is greater than a predetermined speed.

15. A synchronous motor starting system wherein a synchronous motor is energized by a polyphase power source, said system having means for connecting the field winding of the motor to a direct current source at a predetermined phase angle between the rotating magnetic flux wave and the field poles position, said means comprising:

a transducer connected to rotate with the motor to produce an output having a frequency proportional to the speed of the motor and having a predetermined phase angle relationship to the position of the field poles;

a phase comparison circuit connected to receive a measure of a phase of the polyphase power source and a measure of the transducer output for producing a signal pulse when the measure of the phase and the measure of the transducer output are simultaneously in phase at a zero point in their wave forms;

a control circuit for connecting the field winding to the direct current source in response to the signal pulse to effect excitation of the field winding at a predetermined phase angle between the rotating magnetic flux wave and the position of the field poles;

a speed sensing circuit connected to receive the frequency generator output and responsive to the frequency of the frequency generator output for connecting the phase comparison circuit to the control circuit only when the transducer output frequency is greater than a predetermined frequency; and a time delay circuit connected to delay the signal pulse for a predetermined time.

16. A synchronous motor starting system wherein a synchronous motor is energized by a polyphase power source, said system having means for connecting the field winding of the motor to a direct current source at a predetermined phase angle between the rotating magnetic flux wave and the field poles position, said means comprising:

a transducer connected to rotate with the motor to produce an output having a frequency proportional to the speed of the motor and having a constant phase angle relationship to the position of the field poles;

a phase comparison circuit connected to receive a measure of a phase of the polyphase power source and a measure of the transducer output for producing a signal pulse when the measure of the phase and the measure of the transducer output are simultaneously in phase at a zero point in their wave forms;

a control circuit for receiving the signal pulse and connecting the field winding to the direct current source in response to the signal pulse to effect excitation of the field winding at a predetermined phase angle between the measure of the phase of the polyphase power source and the measure of the transducer output;

a speed sensing circuit connected to receive the transducer output and responsive to the frequency of the transducer output for connecting the phase comparison circuit to the control circuit when the transducer output frequency is greater than a predetermined frequency; and a time delay circuit connected between the phase comparison circuit and the control circuit to delay the signal pulse for a predetermined time.

References Cited

UNITED STATES PATENTS

| | | | |
|---|---|---|---|
| 1,768,788 | 7/1930 | Reagan | 318—181 X |
| 2,210,627 | 8/1940 | Lauder | 318—175 X |
| 2,249,821 | 7/1941 | Gulliksen | 318—181 X |
| 2,278,179 | 3/1942 | Lauder | 318—175 X |
| 2,504,812 | 4/1950 | Daugert | 318—183 X |

ORIS L. RADER, *Primary Examiner.*

G. Z. RUBINSON, *Assistant Examiner.*